United States Patent [19]

Dollhausen et al.

[11] 3,864,301

[45] Feb. 4, 1975

[54] HOT ADHESIVES

[75] Inventors: Manfred H. Dollhausen, Odenthal; Gerhard Hohmann, Leverkusen, both of Germany

[73] Assignee: Bayer Aktiengesellschaft, Leverkusen, Germany

[22] Filed: Oct. 23, 1973

[21] Appl. No.: 408,849

[30] Foreign Application Priority Data

Oct. 26, 1972 Germany............................ 2252457

[52] U.S. Cl......... 260/31.2 R, 117/75, 117/122 PA, 156/333, 260/33.6 VA, 260/87.3, 260/897 C
[51] Int. Cl. ........................................... C08f 45/36
[58] Field of Search....... 260/87.3, 33.6 UA, 897 C, 260/31.2 R

[56] References Cited
UNITED STATES PATENTS 3,577,365  5/1971  Folzenlogen et al........ 260/897 C X
3,676,391  7/1972  De Ross...................... 260/33.6 VA Primary Examiner—Morris Liebman
Assistant Examiner—E. Suzanne Parr
Attorney, Agent, or Firm—Connolly and Hutz

[57] ABSTRACT

Adhesives consisting of (a) an ethylene/vinyl ester copolymer; (b) a chlorinated olefin or diene polymer; (c) a chlorinated polyphenyl resin that is solid at room temperature; (d) an aromatic polynitroso compound; and (e) an organic solvent or solvent mixture are used for bonding materials, preferably metals to rubber vulcanisates, for example natural rubber, nitrile rubber, butile rubber, styrene-butadiene rubber vulcanisates, but more particularly to natural rubber vulcanisates.

8 Claims, No Drawings

HOT ADHESIVES

This invention relates to adhesive consisting of an ethylene/vinylester copolymer, a chlorinated olefine or diene polymer a chlorinated polyphenyl resin, an aromatic polynitro compound and at least an organic solvent. The invention also relates to the use of said adhesives for bonding materials, preferably metals to rubber vulcanisates.

It is known that solvent-containing adhesives can be produced from ethylene-vinyl ester copolymers. Thus, U.S. Pat. No. 2,543,229 describes the use of ethylene/vinyl acetate copolymers for the production of solvent-containing adhesives for bonding polyethylene to textiles and paper, but also for bonding less flexible materials such as metal, wood or stone. Solvent-containing adhesives of ethylene-vinylacetate copolymers can also be used for bonding glass into composite safety glass according to German Pat. No. 1,071,953. Furthermore, the use of solvent-containing adhesives for bonding wood and polyurethane foams is described in German Pat. No. 1,295,123.

One serious disadvantage of bonds made with these conventional adhesives is their low strength which, especially at elevated temperatures, falls far short of practical requirements of the kind imposed in the vehicle industry for example on metal/rubber or metal/plastics bonds.

It has now been found that a mixture consisting of (a) an ethylene/vinyl ester random copolymer; (b) a chlorinated olefin or diene polymer; (c) a chlorinated polyphenyl resin that is solid at room temperature; (d) an aromatic polynitroso compound; and (e) an organic solvent or solvent mixture; can be processed to form adhesives which give bonds of much greater strength, particularly at elevated temperatures, coupled with a considerably greater resistance to organic solvents, oils, fats and other outside influences.

Accordingly, the invention provides an adhesive consisting of (a) an ethylene/vinyl ester copolymer; (b) a chlorinated olefin or diene polymer; (c) a chlorinated polyphenyl resin that is solid at room temperature; (d) an aromatic polynitroso compound; and (e) an organic solvent or solvent mixture. The invention also relates to the use of this solution for bonding materials, preferably metals to rubber vulcanisates, for example natural rubber, nitrile rubber, butile rubber, styrene-butadiene rubber vulcanisates, but more particularly to natural rubber vulcanisates.

Polymers of the kind that can be obtained by known polymerisation processes from ethylene and vinyl esters of organic acids having 2 to 10 carbon atoms, are suitable for use as the ethylene-vinyl ester copolymers required for producing the adhesives according to the invention. Examples of suitable vinyl esters include vinylesters of acetic acid, propionic acid, butyric acid, caproic acid, caprylic acid and capric acid. It is preferred to use vinylacetate. Particularly favourable results are obtained by using ethylene-vinylacetate copolymers of the kind described in German Offenlegungsschrift No. 1,495,660, primarily with polymers having a vinylacetate content of from 35 to 50 % by weight, preferably from 40 to 50 % by weight, and, among polymers of this king, those with a melt index of from 1 to 100, preferably from 2 to 15, as measured in accordance with ASTM D 1238, condition E.

Suitable chlorinated olefin or diene polymers include chlorination products of polyethylene or polypropylene which can be obtained by known methods, but above all chlorination products of natural rubber and, more particularly, of polyisoprene and, among these products, especially those with a chlorine content of from 60 to 70 % by weight which, in the form of a 20 % solution in toluene, have a viscosity of more than 40 poises, as measured at 20°C with a Brookfield LVF-viscosimeter (spindle 1, 30 r.p.m.).

Chlorinated polyphenyl resins that are solid at room temperature can be obtained in known manner by chlorinating a mixture consisting essentially of isomers of diphenylbenzene and quaterphenyls up to a chlorine content of from 20 to 70 % by weight, preferably from 35 to 65 % by weight. It is preferred to use a chlorinated polyphenyl resin having a softening point according to DIN 53180 of more than 50°C.

The mixture of components (a) to (c) consists of 5 to 50 parts by weight, preferably 15 to 40 parts by weight, of the ethylene-vinyl ester copolymer; 5 to 50 parts by weight, preferably 15 to 40 parts by weight, of the chlorinated olefin or diene polymers; and 5 to 50 parts by weight, preferably 15 to 40 parts by weight, of the chlorinated polyphenyl resins.

The aforementioned mixture of components (a) to (c) is present in the adhesive according to the invention in a quantity of from 10 to 60 % by weight, preferably from 25 to 35 % by weight.

The proportion of the aromatic polynitroso compound amounts to from 1 to 40 % by weight and preferably to from 4 to 30 % by weight, based in total in the already mentioned adhesive components.

Suitable polynitroso compounds include organic polynitroso compounds which can be obtained by known methods corresponding to the general formula

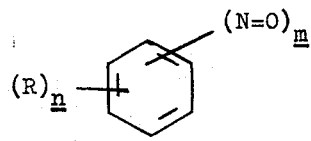

in which R represents hydrogen, alkyl-, alkoxy-, alkanolamine-, cycloalkyl, phenylalkyl-, phenyl-, phenoxy-, phenylalkoxyphenylamine or a phenylnitrosoamine radical or halogen, $n$ is an integer from 0 to 5 and $m$ the number 1 or 2. It is particularly preferred to use p-dinitrosobenzene.

Examples of suitable solvents include aromatic hydrocarbon, for example toluene, xylene and benzene, chlorinated hydrocarbons such as, for example, methylene chloride, trichlorethylene and perchlorethylene, ketones, for example acetone, methylethyl ketone and methylisobutyl ketone, esters, for example, methylacetate, ethylacetate and butylacetate, alcohols such as, for example, methanol, ethanol and butanol or mixtures thereof. The proportion of solvent in the adhesives according to the invention is from 30 to 90 % by weight and preferably from 60 to 90 % by weight.

Particularly preferred combinations of components (a) to (e) are shown in Table 1.

In order to obtain special effects, other substances, for example natural or even synthetic resins, for example phenol-formaldehyde resins, fillers such as silicates and/or carbon black or dyes and/or pigments, can be added to the adhesives according to the invention.

In one special variant, in which the bonds obtained show optimum strength and resistance values, the adhesives according to the invention can be used in conjunction with primer solutions which ensure maximum adhesion to metal.

One preferred primer solution is the solution of a low molecular weight phenol-formaldehyde resin with a chlorinated olefin or diene polymer as mentioned under (b) in a solvent or solvent mixture of the kind mentioned under (e).

The low molecular weight phenol-formaldehyde resin is a resin with a ratio of phenol to formaldehyde of 1:0.5 to 1.5 and a viscosity (60 % in butanol) of 1,500 to 10,000 cP, as measured at 20°C with a Brookfield LVF viscosimeter.

The primer solution consists of from 5 to 40 parts by weight and preferably of from 5 to 15 parts by weight of phenol-formaldehye resin, of 5 to 40 parts by weight, preferably 5 to 15 parts by weight of the chlorinated olefin or diene polymer mentioned under (b) and of 30 to 90 parts by weight, preferably 70 to 90 parts by weight, of a solvent of the kind mentioned under (e).

To prepare the adhesives or primers according to the invention, the individual components are dissolved or suspended together in one of the aforementioned solvents or in mixtures of the solvents in the quantitative proportions specified above at temperatures of from 10° to 40°C, preferably at room temperature. It is pointed out, however, that the temperature range is by no means specific so far as preparation is concerned, but should merely be regarded as a suitable temperature range.

The adhesives according to the invention and the primer can be applied to the material to be bonded by the usual methods, for example by dip-coating, spread-coating or spray-coating.

To prepare the bonds, the adhesives according to the invention are applied in the form of a thin layer to the metal or vulcanisate surfaces to be bonded together.

Before the adhesives are applied, the surfaces of the metals to be bonded are best sand-blasted and degreased with trichlorethylene, and the surfaces of the vulcanisates to be bonded cleaned with trichlorethylene. The metals and vulcanisates coated with the adhesives according to the invention are united with the adhesive layers following evaporation of the solvent and heated for up to an hour or even longer at elevated temperatures, preferably at temperatures of from 100° to 200°C. The bond remains fixed on heating under a pressure which ensures intimate contact of the adhesive layers.

The resulting composite materials which are distinguished by their outstanding strength and by their high resistance to organic solvents, oils and fats, can be used in a variety of different fields, for example in the motor-vehicle industry for the production of safety components in motor vehicles.

The invention is illustrated in but by no means limited to the following examples.

EXAMPLES

The adhesives specified in Table 1 were used for the following Examples:

Table 1

| Adhesive | A | B | C | D | E | F | |
|---|---|---|---|---|---|---|---|
| ethylene-vinylacetate copolymer[1] | 8 | 8 | 8 | 4 | 8 | 8 | parts by weight |
| chlorinated polyisoprene[2] | 8 | 8 | 8 | 8 | 4 | 8 | do. |
| chlorinated polyphenyl[3] | 8 | 8 | 8 | 8 | 8 | 4 | do. |
| carbon black[4] | 2 | 2 | 2 | 2 | 2 | 2 | do. |
| p-dinitrosobenzene | 4 | 2 | 6 | 4 | 4 | 4 | do. |
| xylene | 55 | 55 | 55 | 55 | 55 | 55 | do. |
| perchlorethylene | 15 | 15 | 15 | 15 | 15 | 15 | do. |

[1] with a vinylacetate content of 45 % and a melt index in the range of from 2 to 5, as measured in accordance with ASTM D 1238, condition E
[2] with a chlorine content of 67 % and a viscosity of 160 cP (20 % in toluene), as measured at 20°C with a Brookfield LVF viscosimeter (spindle 1, 30 r.p.m.)
[3] with a chlorine content of 52 % and a softening point according to DIN 53180 in the range of 60°C to 70°C
[4] MT-carbon black (thermal carbon black).

Bonds of grade 9 S 20 K free-cutting steel with different rubber materials were produced with these adhesives. The structure and vulcanisation conditions of the different rubbers used are shown in Table 2.

Table 2

Vulcanisate I
    100.0 parts by weight of natural rubber;
    20.0 parts by weight of zinc oxide;
    2.0 parts by weight of stearic acid;
    1.2 parts by weight of phenyl-$\beta$-naphthylamine;
    30.0 parts by weight of ISAF-carbon black (oven soot);
    1.0 part by weight of 2-mercaptobenzothiazole; and
    3.5 parts by weight of sulphur
vulcanisation: 35 minutes at 140°C Vulcanisate II
    100.0 parts by weight of nitrile rubber (33% of acrylonitrile);
    7.5 parts by weight of zinc oxide;
    0.5 parts by weight of stearic acid;
    40.0 parts by weight of SRF-carbon black (oven soot);
    1.0 part by weight of collophony;
    2.0 parts by weight of methylene-bis-thioglycolic acid butyl ester;
    5.0 parts by weight of coumarone resin;
    0.8 parts by weight of benzothiazyl-2-diethyl sulphenamide; and
    1.7 parts by weight of sulphur
vulcanisation: 35 minutes at 140°C Vulcanisation III
    100.0 parts by weight of butyl rubber;
    5.0 parts by weight of zinc oxide;
    60.0 parts by weight of APF-carbon black (oven soot)
    3.0 parts by weight of pinewood tar;
    1.5 parts by weight of zinc-N-diethyl dithiocarbamate;
    2.0 parts by weight of mercaptobenzothiazole; and
    2.0 parts by weight of sulphur
vulcanisation: 45 minutes at 140°C Table 2-Continued Vulcanisate IV
    100.0 parts by weight of styrene butadiene rubber;
      5.0 parts by weight of zinc oxide;
      1.0 part by weight of stearic acid;
     60.0 parts by weight of HAF-carbon black (oven soot);
     15.0 parts by weight of aromatic mineral oil plasticiser;
      1.5 parts by weight of phenyl-β-naphthylamine;
      1.4 parts by weight of benzothiazyl-2-cyclohexyl sulphenamide;
      0.1 part by weight of tetramethyl thiuram monosulphide; and
      1.8 parts by weight of sulphur
vulcanisation: 20 minutes at 150°C The test specimens were produced in accordance with ASTM D 429–68 method B. Metal strips that had been sandblasted and degreased with trichlorethylene and strips of the particular vulcanisates to be bonded, cleaned with trichlorethylene, were coated with thin layers of the adhesives specified in Table 1. After drying for 3 hours at room temperature, the coated metal and vulcanisate strips were united with the adhesive layers in between and heated under light pressure for 40 minutes at 140°C. After the test specimens had been stored for 24 hours at room temperature, the strength of the rubber-metal bonds was determined by the delamination test according to ASTM Test Method D 429–68 Method B both at room temperature and at elevated temperatures. The results obtained are set out in Table 3.

The strengths of bonds obtained by using a primer X of the following composition are also set out in Table 3:

| | |
|---|---|
| chlorinated polyisoprene[1] | 10 parts by weight |
| phenol-formaldehyde resin[2] | 8 parts by weight |
| carbon black[3] | 2 parts by weight |
| methylisobutyl ketone | 80 parts by weight |

[1] with chlorine content of 67 % and a viscosity of 160 cP (20 % in toluene), as measured at 20°C with a Brookfield LVF viscosimeter (spindle 1, 30 r.p.m.)
[2] non-modified hardenable phenol-formaldehyde condensation product (60 % in butanol) with a viscosity of 3200 cP, as measured at 20°C with a Brookfield LVF viscosimeter (spindle 3, 30 r.p.m.)
[3] MT-carbon black (thermal carbon black)

The primer X was applied in a thin layer to the sandblasted and degreased metal strips. After drying for 30 minutes, the adhesives specifed in Table 1 were applied to the primer-coated metal strips and to the rubber vulcanisates. After another 3 hours, the test specimens were prepared as already described in accordance with ASTM D 429–68 Method B.

Adhesives of the following composition prepared in accordance with German Pat. No. 1,295,123 were used for comparison in Examples 19 and 20:

Adhesive K
| | |
|---|---|
| ethylene-vinylacetate copolymer[1] | 11 parts by weight; |
| maleic resin[2] | 2 parts by weight; |
| terpene-phenol resin[3] | 2 parts by weight; |
| methylene chloride | 35 parts by weight; |
| toluene | 35 parts by weight; |
| petrol (b.p. 65°C–95°C) | 15 parts by weight |

[1] with a vinylacetate content of 45 % and a melt index of 2 to 5, as measured in accordance with ASTM D 1238, condition E
[2] with an acid number according to DIN 53183 of 16 and a melting point according to DIN 53181 of 130°C
[3] with an acid number according to DIN 53183 of 65 and a melting point according to DIN 53 181 of 140°C.

Table 3

| Example | Vulcanisate | Adhesive | Primer | Bond strength (kp/cm²) | | | |
|---|---|---|---|---|---|---|---|
| | | | | 20°C | 80°C | 100°C | 120°C |
| 1 | I | A | — | 18.6*) | 6.3 | 3.5 | 1.9 |
| 2 | I | A | x | 23.4*) | 12.7 | 6.3 | 3.7 |
| 3 | II | A | — | 12.4 | | | |
| 4 | II | A | x | 19.3*) | | | |
| 5 | III | A | — | 9.4 | | | |
| 6 | III | A | x | 14.2*) | | | |
| 7 | IV | A | — | 8.2 | | | |
| 8 | IV | A | x | 14.0*) | | | |
| 9 | I | B | — | 16.2*) | 5.7 | 2.8 | 1.3 |
| 10 | I | B | x | 21.2*) | 11.8 | 5.4 | 2.5 |
| 11 | I | C | — | 15.4*) | 4.6 | 2.4 | 1.3 |
| 12 | I | C | x | 20.4*) | 9.7 | 4.5 | 2.1 |
| 13 | I | D | — | 17.8*) | | | |
| 14 | I | D | x | 22.6*) | | | |
| 15 | I | E | — | 14.7*) | | | |
| 16 | I | E | x | 18.2*) | | | |
| 17 | I | F | — | 14.2*) | | | |
| 18 | I | F | x | 18.8*) | | | |
| 19 | I | K | — | 1.5 | — | — | — |
| 20 | I | K | x | 2.5 | — | — | — |

*) separation of the vulcanisate

We claim:
1. An adhesive composition comprising (a) 5 to 50 parts by weight of a copolymer of ethylene and a vinyl ester of an organic acid having 2 to 10 carbon atoms; (b) 5 to 50 parts by weight of a chlorination product of at least one member of the group consisting of polyethylene, polypropylene, natural rubber and polyisoprene, said chlorination product having a chlorine content of 60 to 70% by weight; (c) 5 to 50 parts by weight of a chlorinated polyphenyl resin which is solid at room temperature and is obtained by chlorinating a mixture consisting essentially of isomers of diphenylbenzene and quaterphenyls up to a chlorine content of from 20 to 70% by weight; (d) 1 to 40% by weight, based on the total weight of components (a), (b) and (c), of an aromatic polynitroso compound of the formula

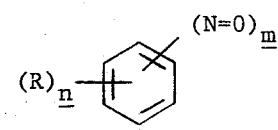

wherein R is hydrogen, alkyl, alkoxy, alkanolamine, cycloalkyl, phenylalkyl, phenyl, phenylalkoxy, phenylamine, phenylnitrosoamine or halogen, $n$ is an integer from 0 to 5 and $m$ is 1 or 2 and (e) 30 to 90% by weight, based on the weight of the adhesive composition, of at least one solvent selected from the group consisting of aromatic hydrocarbons, chlorinated hydrocarbon ketones, esters and alcohols.

2. The adhesive composition of claim 1 wherein (a) is a copolymer of ethylene and vinyl acetate with a vinyl acetate content of from 35 to 50% by weight, (b) is a chlorination product of at least one member selected from the group consisting natural rubber and polyisoprene and has a chlorine content from 60 to 70% by weight and (d) is a p-dinitrosobenzene.

3. The adhesive composition of claim 1 wherein (e) is selected from the group consisting of toluene, xylene, benzene, methylene chloride, trichlorethylene, perchlorethylene, acetone, methylethyl ketone, methylisobutyl ketone, methylacetate, ethylacetate, butylacetate, methanol, ethanol and butanol.

4. The adhesive composition of claim 1 wherein (a) is a copolymer of ethylene and vinyl acetate with a vinyl acetate content of 45% and a melt index of from 2 to 5; (b) is chlorinated polyisoprene with a chlorine content of 67% and a viscosity of 160 cP; (c) is chlorinated polyphenyl with a softening point of 60° to 70°C. and a chlorine content of 52%; (d) is p-dinitrosobenzene and (e) is xylene, perchlorethylene or a mixture thereof.

5. The adhesive composition of claim 1 wherein each of (a), (b) and (c) is present in an amount of 15 to 40 parts by weight; (d) is present in an amount of 4 to 30% by weight, based on the total weight of components (a), (b) and (c) and (e) is present in an amount of 60 to 90% by weight, based on the weight of the adhesive composition.

6. A process for bonding a metal to a rubber vulcanizate wherein an adhesive composition of claim 1 is coated onto surfaces of the metal and the rubber vulcanizate to be bonded as a thin layer, the coated surfaces are united and the solvent (e) is evaporated.

7. The process of claim 6 wherein th solvent (e) is evaporated from the coated surfaces before the coated surfaces are united.

8. The process of claim 6 wherein a primer is applied to the surfaces to be bonded and the adhesive composition is subsequently applied thereto.

* * * * *